(12) United States Patent
Zaifman et al.

(10) Patent No.: US 10,091,082 B2
(45) Date of Patent: Oct. 2, 2018

(54) METHODS AND APPARATUS TO CAPTURE DATA PLANE INFORMATION

(71) Applicant: AT&T Intellectual Property I, L.P., Atlanta, GA (US)

(72) Inventors: Arthur L. Zaifman, Millburn, NJ (US); Sandra Hall, Laporte, PA (US); John M. Mocenigo, Califon, NJ (US); Hemanshu Patel, Monroe Township, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 344 days.

(21) Appl. No.: 14/556,050

(22) Filed: Nov. 28, 2014

(65) Prior Publication Data

US 2016/0156535 A1    Jun. 2, 2016

(51) Int. Cl.
*H04L 12/26* (2006.01)
*H04L 12/947* (2013.01)
*H04L 12/717* (2013.01)

(52) U.S. Cl.
CPC .......... *H04L 43/0876* (2013.01); *H04L 45/42* (2013.01); *H04L 49/25* (2013.01)

(58) Field of Classification Search
CPC .................................................. H04L 43/0876
See application file for complete search history.

(56) References Cited

U.S. PATENT DOCUMENTS

| | | | |
|---|---|---|---|
| 7,099,271 B2 | 8/2006 | Friesen et al. | |
| 7,415,028 B1 | 8/2008 | Allam | |
| 7,415,627 B1 * | 8/2008 | Radhakrishnan | H04L 41/069 709/224 |
| 7,447,872 B2 | 11/2008 | Schroter et al. | |
| 7,826,381 B1 * | 11/2010 | Kastuar | H04L 12/4641 370/242 |
| 8,559,314 B2 | 10/2013 | Yedavalli et al. | |
| 8,762,501 B2 | 6/2014 | Kempf et al. | |
| 8,787,250 B2 | 7/2014 | Beser | |
| 8,804,490 B2 | 8/2014 | Tatipamula et al. | |

(Continued)

FOREIGN PATENT DOCUMENTS

WO    2014071723    5/2014

OTHER PUBLICATIONS

Salisbury, "The Control Plane, Data Plane and Forwarding Plane in Networks", published by Network Static, on Sep. 27, 2012, from http://networkstatic.net/the-control-plane-data-plane-and-forwarding-plane-in-networks/, 5 pages.

(Continued)

*Primary Examiner* — Nicholas Taylor
*Assistant Examiner* — Sanjoy Roy
(74) *Attorney, Agent, or Firm* — Hanley, Flight & Zimmeran, LLC

(57) ABSTRACT

Methods and apparatus to capture data plane information are disclosed. An example method includes capturing, via an observation point deployed between core routers of a network, data plane information traversing between the core routers of the network; generating an observational data plane using the data plane information captured via the observation point; and conveying the observational data plane to a data plane process implemented separately from a control plane process.

20 Claims, 10 Drawing Sheets

(56) References Cited

U.S. PATENT DOCUMENTS

| | | |
|---|---|---|
| 8,811,212 B2 | 8/2014 | Beheshti-Zavareh et al. |
| 2006/0092976 A1* | 5/2006 | Lakshman .............. H04L 45/04 370/469 |
| 2007/0011321 A1* | 1/2007 | Huntington ........... H04L 43/028 709/224 |
| 2007/0201357 A1* | 8/2007 | Smethurst ........... H04L 63/1458 370/229 |
| 2010/0189004 A1* | 7/2010 | Mirandette ........... H04W 24/08 370/252 |
| 2010/0202419 A1 | 8/2010 | Uminski et al. |
| 2010/0211675 A1* | 8/2010 | Ainali ................. H04L 43/0852 709/224 |
| 2010/0290396 A1 | 11/2010 | Karunakaran et al. |
| 2012/0051229 A1* | 3/2012 | Feldmann ............... H04L 43/12 370/242 |
| 2012/0303835 A1 | 11/2012 | Kempf et al. |
| 2013/0034104 A1 | 2/2013 | Yedavalli et al. |
| 2014/0078988 A1* | 3/2014 | Kant ................... H04L 41/0813 370/329 |
| 2014/0163810 A1 | 6/2014 | Roettger et al. |

OTHER PUBLICATIONS

Edgeworth, et al., "IP Routing on Cisco IOS, IOS XE, and IOS XR: How a Router Works", published by Cisco Press, on Jan. 2, 2015, from http://www.ciscopress.com/articles.asp?p=2272154&seqNum=3, 2 pages.

* cited by examiner

METHODS AND APPARATUS TO CAPTURE DATA PLANE INFORMATION

FIELD OF THE DISCLOSURE

This disclosure relates generally to networking and, more particularly, to methods and apparatus to capture data plane information.

BACKGROUND

Cloud environments provide shared access to computing resources of a computing infrastructure. For example, cloud environments provide shared access to computational resources, storage resources, and/or data management resources of one or more computing components of the computing infrastructure. Because the cloud environment provides shared access to the computing resources, coherency among the computing resources is important. Coherency is a consistent view of shared information and/or resources among the different computing components of the cloud environment.

DETAILED DESCRIPTION

Figure 1:
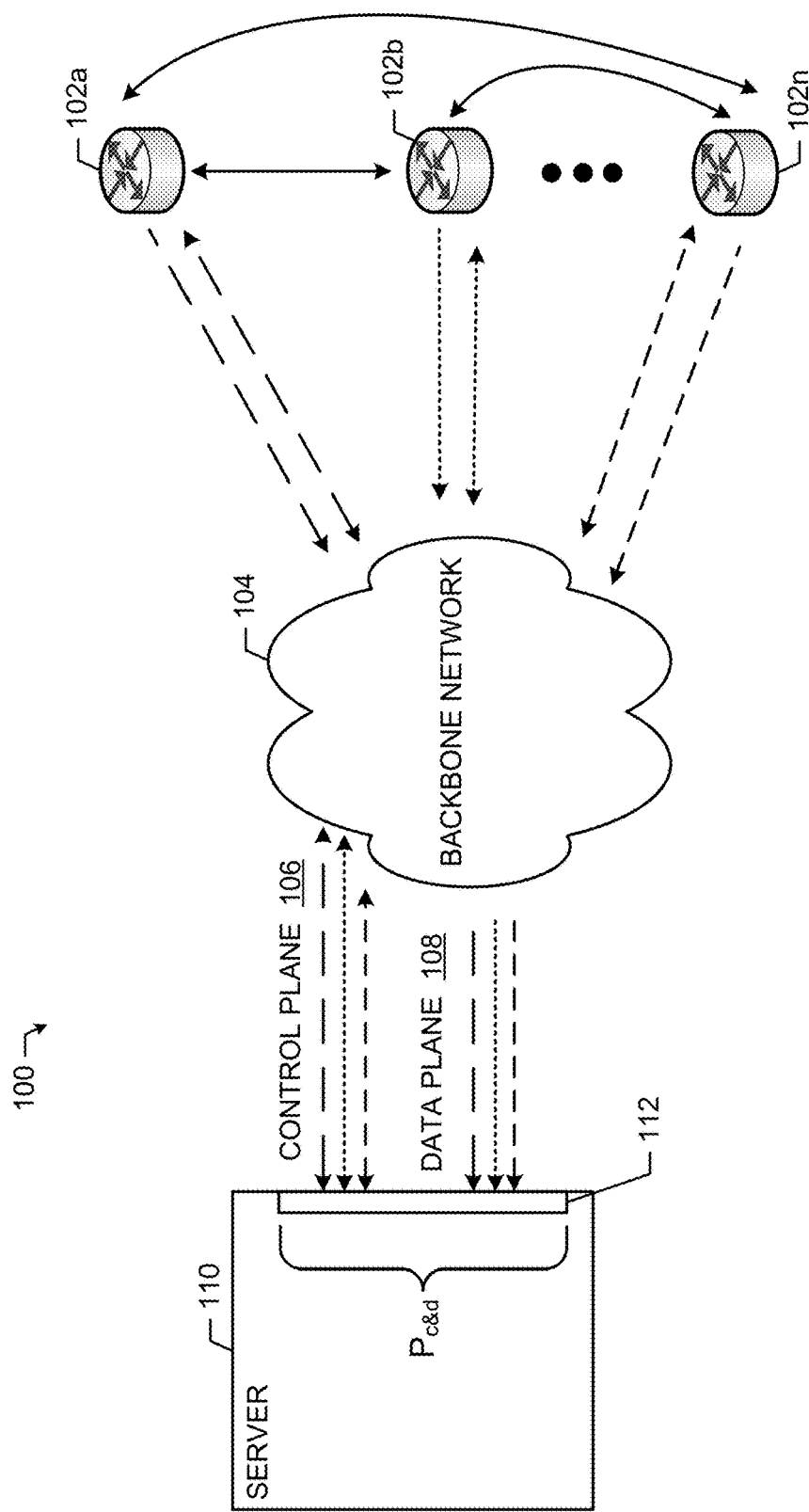
FIG. 1 is an illustration of a known network computing environment.

FIG. 1 is a diagram of a known example network environment 100 in which cloud services may be provided. Cloud services typically involve providing shared access to one or more computing resources of, for example, a centralized and/or distributed infrastructure. As such, coherency among the computing resources is important. Coherency is a consistent view of shared information and/or resources among the different computing components of, for example, a cloud environment including the shared information and/or resources. To maintain and/or manage coherency among the computing components, the example network environment 100 of FIG. 1 includes a plurality of route reflectors 102a-n that populate, update and/or otherwise mange routing tables that are used to provide forwarding paths among the computing components of the network environment 100. In some examples, the route reflectors 102a-n of FIG. 1 store virtual routing and forwarding (VRF) tables that define a network map for the example network environment 100 of FIG. 1. As the tables are updated, the route reflectors 102a-n propagate the updates to the computing components of the network environment 100, including other ones of the route reflectors 102a-n, such that each computing component shares a common view of the network map. The example of FIG. 1 includes a backbone network 104 via which the routing information is shared and implemented. The example backbone network 104 of FIG. 1 includes, for example, core routers that receive the routing table information from the route reflectors 102a-n.

The route reflectors 102a-n and the routing tables implemented by the route reflectors 102a-n are illustrative components of the network environment 100 that implement and/or maintain a routing configuration of the network environment 100. Additional and/or alternative data, components, and/or techniques are typically implemented to facilitate the routing configuration of the network environment 100. The aspects of the network environment 100 dedicated to implementing and/or maintaining the routing configuration of the network environment 100 are referred to as a control plane 106. Thus, generally, the control plane 106 defines how data is to be forwarded across the example network environment 100 of FIG. 1.

In the example of FIG. 1, a data plane 108, which may be referred to as a forwarding plane, carries the network data in accordance with the configuration laid out by the control plane 106. That is, the data plane 108 of FIG. 1 performs the actual forwarding of the network data according to, for example, the routing tables managed via the control plane 106.

In the illustrated example of FIG. 1, the control plane 106 and the data plane 108 both arrive at, for example, a server 110 (e.g., a common off the shelf (COTS) server) of the network environment 100 via a single network interface card (NIC) 112. The NIC 112 of FIG. 1 implements a single process $P_{c\&d}$ to service the control plane 106 and the data plane 108. For example, the control plane 106 includes signaling/session traffic sent from the NIC 112 and arriving at the NIC 112. Further, the data plane 108 includes coherency traffic arriving at the NIC 112. Because the process $P_{c\&d}$ handles the control plane 106 and the data plane 108 in the example of FIG. 1, failure in either the control plane aspects of $P_{c\&d}$ or the data plane aspects of $P_{c\&d}$ causes a need to, for example, re-synchronize the server 110 with other components of the network environment 100 via the route reflectors 102a-n. Resynchronization can involve transfer of entire contents of databases (e.g., of the route reflectors 102a-n, which is costly in terms of, for example, time, network resources, and computational resources of the route reflectors 102a-n, the server 110, and, more generally, the network environment 100. Due at least to such costs, reduction in resynchronization events is desirable. However, in some instances, one of the control plane 106 and the data plane 108 is more complex than the other. In such instances, handling of both of the data plane 108 and the control plane 106 at the same NIC 112 causes the less complex one of the control plane 106 and the data plane 108 to experience otherwise avoidable failures. For example, an error in the data plane 108 at the process $P_{c\&d}$ causes a need to resynchronize the control plane 106 even though the error did not occur in the control plane 106.

Some known system address this issue by executing multiple redundant instances of the process $P_{c\&d}$ on the server 110. Each of the redundant instances of the process $P_{c\&d}$ provides an alternative to the NIC 112 in the case of a failure. In some systems, different development teams create different versions of the process $P_{c\&d}$ that are each implemented on the server 110. In such systems, as the different versions of the process $P_{c\&d}$ fail, the surviving versions are considered the more desirable and are used going forward. Additionally, some systems distribute workloads among the desirable versions of the process $P_{c\&d}$. However, this technique involves an increase in processing loads on the server 110, the route reflectors 102*a-n*, and other network components. Further, with this technique, the relatively higher complexity of, for example, the data plane 108 remains as an undesirable effect on the performance of the control plane 106.

Example methods, apparatus, and articles of manufacture disclosed herein provide advantageous techniques to, for example, improve network resiliency, reduce coherency traffic, and provide resilient distributed cloud services. As disclosed in detail below, examples disclosed herein capture data plane traffic via one or more observation points deployed between, for example, core routers of a network. Examples disclosed herein use the captured data plane traffic to generate an observational data plane. Examples disclosed herein utilize to the observational data plane to enable separate handling of the data plane traffic and the control plane traffic. As a result of the separate handling provided by examples disclosed herein, one or more metrics (e.g., mean time to failure, meant time between failure, and/or probability of failure) associated with the control plane and/or the data plane are improved. For example, a probability of control plane failure in a first network element (e.g., server) decreases significantly due to a reduction of complexity in the first network element afforded by a second, different element handling the data plane traffic. As control plane failure typically requires resynchronization events and the accompanying coherency traffic traversing the network, any reduction in control plane failure is desirable.

Additionally, example methods, apparatus, and articles of manufacture disclosed herein utilize the observational data plane provided by the observation point(s) to provide one or more services via, for example, a virtual infrastructure associated with a computing network. For instance, examples disclosed herein utilize the observational data plane to unobtrusively (e.g., in a read-only manner without actively participating in exchange of data plane or control plane data) provide access to data plane traffic and/or applications designed to evaluate, translate, manipulate (e.g., for testing purposes), and/or otherwise make use of the data plane traffic. In some examples, the observational data plane provided by examples disclosed herein can be used to create a cloud-based application framework to which users may be granted access. The applications made available via the cloud-based application framework provided by examples disclosed herein include any suitable type of applications associated with the data plane.

Notably, examples disclosed herein provide these and other advantages without incurring the increased computational load, resource drain, and cost of additional equipment placed on the network by, for example, previous approaches that involve large instances of redundant processes and/or network elements. Moreover, examples disclosed herein provide the above advantages and other advantages without introducing an active participate (e.g., data origination point) into the exchange of coherency traffic in the network. Instead, examples disclosed herein passively capture data plane traffic and make use of the captured data plane traffic without interfering with the exchange of information on the network.

Figure 2:
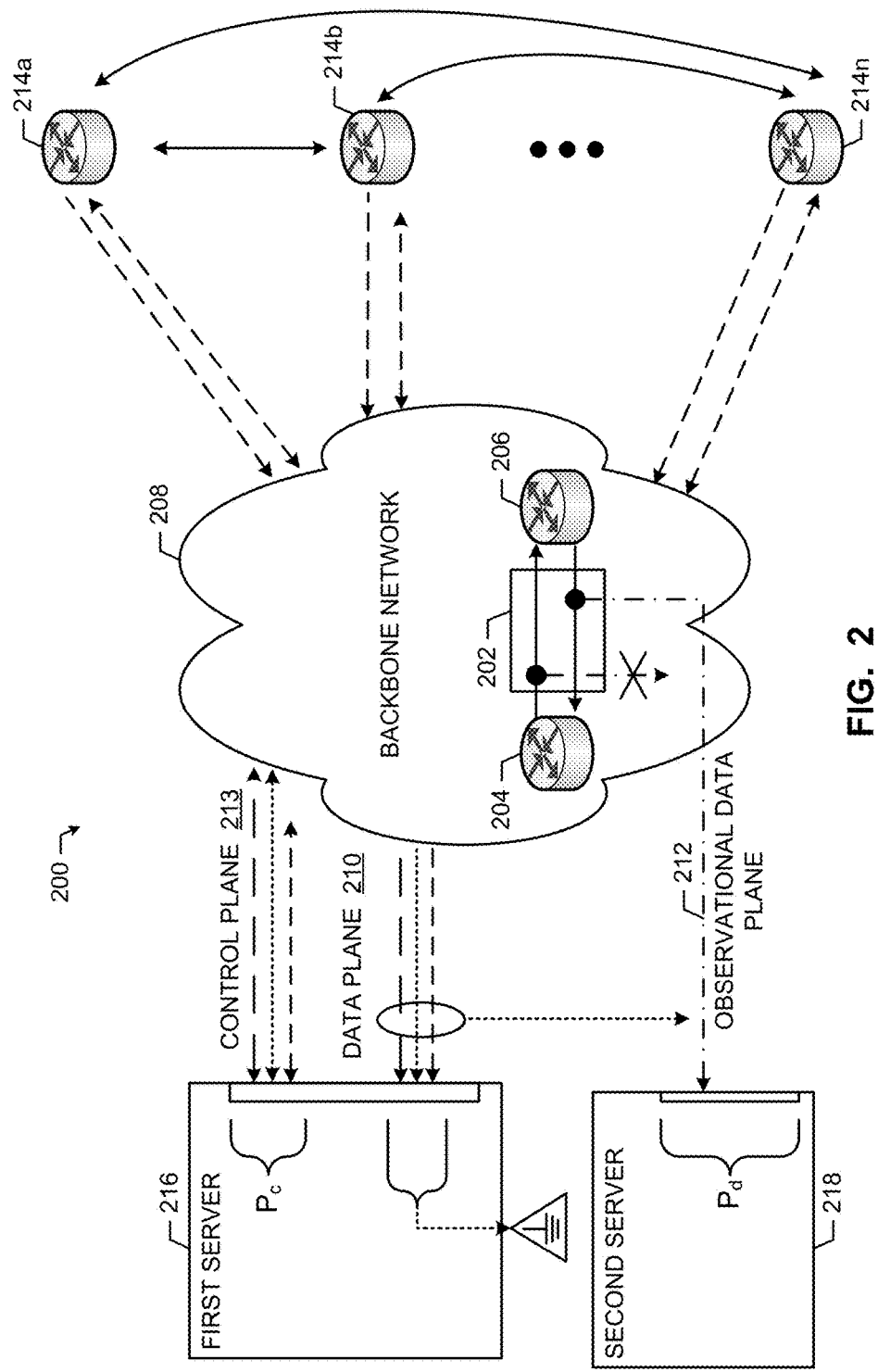
FIG. 2 is an illustration of a network computing environment including an example observation point constructed in accordance with teachings of this disclosure.

FIG. 2 illustrates an example network environment 200 implementing example teachings of this disclosure. In the illustrated example of FIG. 2, an observation point 202 is deployed between core routers 204 and 206 of a backbone network 208. As disclosed herein, the example observation point 202 of FIG. 2 captures information from a data plane 210 from the point (e.g., between the core routers 204 and 206 and/or another point in the backbone network 208) at which the observation point 202 is deployed. Further, as disclosed herein, the example observation point 202 of FIG. 2 derives an observational data plane 212 from the captured data plane information such that the observational data plane 212 can enable separate handling of the data plane 210 and a control plane 213. Further, as disclosed below in connection with FIG. 4, the example observation point 202 of FIG. 2 and the observational data plane 212 derived by the observation point 202 enables one or more services to be provided to one or more users via, for example, a cloud-based application framework.

Figure 3:
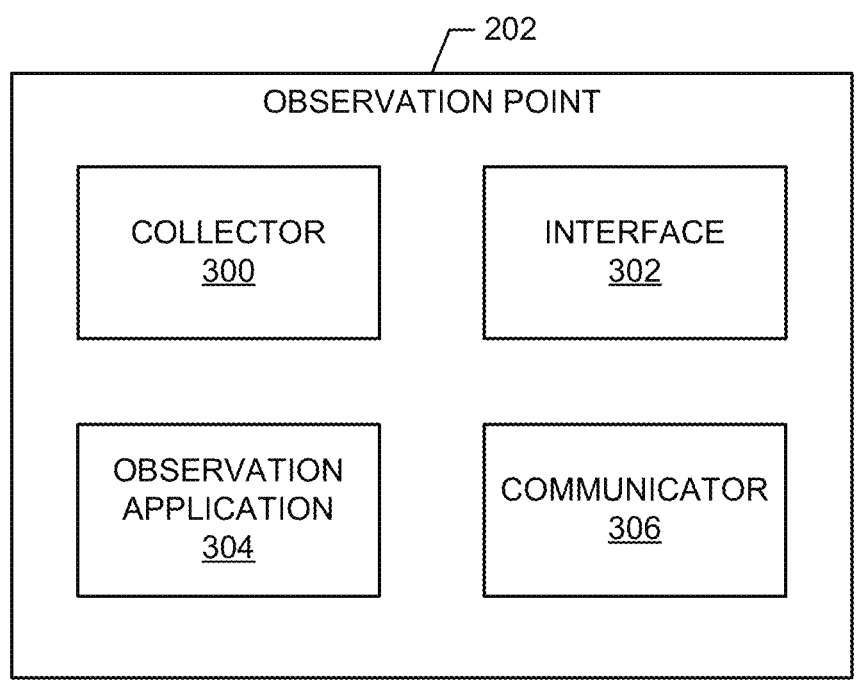
FIG. 3 is a block diagram of an example implementation of the example observation point of FIG. 2.

An example implementation of the observation point 202 of FIG. 2 is illustrated in FIG. 3. While, the example observation point 202 of FIG. 3 is described in conjunction with the network environment 200 of FIG. 2, the example observation point 202 of FIG. 2 can be implemented in any suitable manner. The example observation point 202 of FIG. 3 includes a collector 300 to capture traffic from a data plane 210 to generate an observational data plane 212. In the illustrated example of FIG. 3, the collector 300 is implemented by a fiber-optic splitter deployed on a transmission medium (e.g., a fiber-optic cable) utilized by the example core routers 204 and 206 and/or intervening network components in the example backbone network 208 of FIG. 2. However, the example observation point 202 of FIG. 3 can utilize any suitable data capture component(s) to obtain the data plane traffic. While the example collector 300 of FIG. 3 is shown as part of the observation point 202, in some examples the example collector 300 is deployed as a separate component from other components of the example collector 300 of FIG. 3. That is, in some examples, the observation point 202 of FIG. 3 is placed in communication with the collector 300 (e.g., a fiber-optic splitter), which may be already deployed in the backbone network 208.

In the illustrated example of FIG. 2, the data plane 210 from which the observational data plane 212 is generated is referred to as the legacy data plane 210. The example collector 300 of FIG. 3 looks for packets corresponding to the data plane 210 according to a network connection identifier (e.g., a URI assigned to data plane traffic) associated with data plane traffic. Additionally, the example collector 300 of FIG. 3 identifies packets corresponding to the control plane 213 according to a network connection identifier (e.g., a URI assigned to control plane traffic) associated with control with data plane traffic. In some examples, the collector 300 is configured to identify data having the network connection identifier(s) such that the data plane traffic can be obtained by the observation point 202.

The example observation point 202 of FIG. 3 includes an interface 302 to receive the data obtained by the example collector 300. The example collector 300 of FIG. 3 and the example interface 302 of FIG. 3 communicate via any suitable manner and/or protocol. In some examples, the manner of communication (e.g., wired and/or wireless communication protocols) between the collector 300 and the interface 302 is selected based on (e.g., is determined by) whether the example collector 300 and the example interface 302 are implemented as physically separate components (e.g., in different housings) or in a single component (e.g., a housing). Additionally or alternatively, when the collector 300 and the interface 302 are implemented as separate components or devices, the manner of communication between the collector 300 and the interface 302 is selected based on a proximity of the collector 300 to the example interface 302. In the illustrated example of FIG. 3, the interface 302 is implemented by a special-purpose NIC having lossless packet observation (LPO) capabilities and/or features. Lossless packet observation (LPO) is a feature of certain NICs (e.g., NICs implemented on servers for Lawful Interception (e.g., wire-tapping) purposes). While the "lossless" property of such equipment does not mean that loss cannot occur, the "lossless" property of such equipment means that the NIC 302 is able to detect when loss (e.g., packet loss) occurs. Further, the LPO of the example interface 302 of FIG. 3 includes a guarantee that the observation point 202 sees all of the packets exchanged on the observed communications. Notably, the LPO of the example interface 302 enables the observation point 202 to see all packets without having to keep track of or stay in-sync with management applications (e.g., a particular protocol state machine) managing the observed exchanges. Put another way, the LPO capability of the example interface 302 of FIG. 3 enforces the passive nature of the observation point 202 by eliminating the possibility of active participation by the observation point 202 in the control and data plan exchanges. The passive interception implemented by the example observation point 202 of FIG. 2 is read-only and, thus, the example observation point 202 does not request a retransmission when a packet is lost. Accordingly, capture of the data plane traffic by the example observation point 202 of FIG. 2 (e.g., to generate the observational data plane 212) is unaffected (e.g., does not prevent accurate collection of data) by failures or errors in the legacy data plane 210.

The example observation point 202 of FIG. 3 includes an observation application 304 to drive the collection performed by the example collector 300 and/or operations of the example interface 302. In some examples, driving the collector 300 and/or the interface 302 includes an initial configuration of the collector 300 and/or the interface 302. In some examples, if the collector 300 includes any updatable aspects (e.g., programmable firmware), driving the collector 300 includes providing updates and/or performing maintenance (e.g., status checks) of the collector 300. In some examples, if the interface 302 includes any updateable aspects (e.g., programmable firmware and/or software), driving the interface 302 includes providing updates (e.g., software updates) to the interface 302 and/or maintaining (e.g., checking a status) the interface 302.

Additionally, the example observation application 304 of FIG. 3 processes the collected data to form the example observational data plane 212 of FIG. 2. To form the example observational data plane 212 of FIG. 2, the example observation application 304 of FIG. 3 generates a merged stream of the data plane traffic associated with, for example, a plurality of route reflectors 214a-n and/or the core routers 204 and 206. In the example of FIG. 2, the observational data plane 212 includes the data plane information from each of the route reflectors 214a-n. The merged stream of the data plane traffic generated by the example observation application 304 of FIG. 3 is a copy of the legacy data plane 210.

In the illustrated example, the observation point 202 captures (e.g., via the example collector 300 and the interface 302) the data plane traffic such that the observational data plane 212 maintains the "on-the-wire" representation. For example, the example observation point 202 captures and maintains entire Ethernet frames when the legacy data plane 210 includes Ethernet protocol data. The example observation point 202 of FIG. 3 includes a communicator 306 to facilitate conveyance of the observational data plane 212 to any suitable destination. In some examples, the communicator 306 utilizes the example interface 302 through which the data plane traffic is received. Additionally or alternatively, the example communicator 306 utilizes a different interface (e.g., a separate NIC) to convey the data. Example destinations for the data plane traffic are disclosed below in connection with FIGS. 4-7. As described in detail below in connection with FIGS. 4-7, the observational data plane 212 is used to provide one or more services via, for example, an application framework accessible via cloud services.

In the example of FIG. 2, the legacy data plane 210 and the control plane 213 arrive at a first server 216 much like the control plane 106 of FIG. 1 and the data plane 108 of FIG. 1 arrives at the server 110 of FIG. 1. However, in the example of FIG. 2, the observation point 202 provides the observational data plane 212 to a second server 218. In some examples, the first server 216 and the second server 218 reside on the same machine. Alternatively, to provide better availability, the first server 216 and the second server 218 reside on different machines. In the example of FIG. 2, the first server 216 includes a control plane process $P_c$ to handle the control plane 213. The example first server 216 of FIG. 2 discards the data associated with the legacy data plane 210. Thus, communication sessions (e.g., TCP sessions) are maintained across the legacy data plane 210, but the packets are discarded to reduce complexity and improve performance (e.g., MTTF) of the control plane process $P_c$. As such, the process $P_c$ of the example first server 216 of FIG. 2 is dedicated to the control plane 213 without having to handle the legacy data plane 210. As discussed above, this separation of the control plane 213 from the data plane 210 provides significant reduction in complexity and, thus, significant reduction in failures and resynchronization events.

In the example of FIG. 2, the observational data plane 212 arrives at the second server 218, which includes a data plane process $P_d$ to handle the observational data plane 212. As such, the process $P_d$ of the example second server 218 of FIG. 2 is dedicated to the observational data plane 212 without having to handle the control plane 213. Notably, the separation of the process $P_{c\&d}$ of FIG. 1 into the control plane process $P_c$ and the data plane process $P_d$ in FIG. 2 is accomplished without requiring costly redundant systems and while maintaining coherency (e.g., a consistent view of shared information by all) throughout the network environment 200.

While an example manner of implementing the observation point 202 of FIG. 2 is illustrated in FIG. 3, one or more of the elements, processes and/or devices illustrated in FIG. 3 may be combined, divided, re-arranged, omitted, eliminated and/or implemented in any other way. Further, the example collector 300, the example interface 302, the example observation application 304, the example communicator 306 and/or, more generally, the example observation point 202 of FIG. 3 may be implemented by hardware, software, firmware and/or any combination of hardware, software and/or firmware. Thus, for example, any of the example collector 300, the example interface 302, the example observation application 304, the example communicator 306 and/or, more generally, the example observation point 202 of FIG. 3 could be implemented by and/or include one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collector 300, the example interface 302, the example observation application 304, the example communicator 306 and/or, more generally, the example observation point 202 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example observation point 202 of FIG. 2 may include one or more elements, processes and/or devices in addition to, or instead of, those illustrated in FIG. 3, and/or may include more than one of any or all of the illustrated elements, processes and devices.

Figure 4:
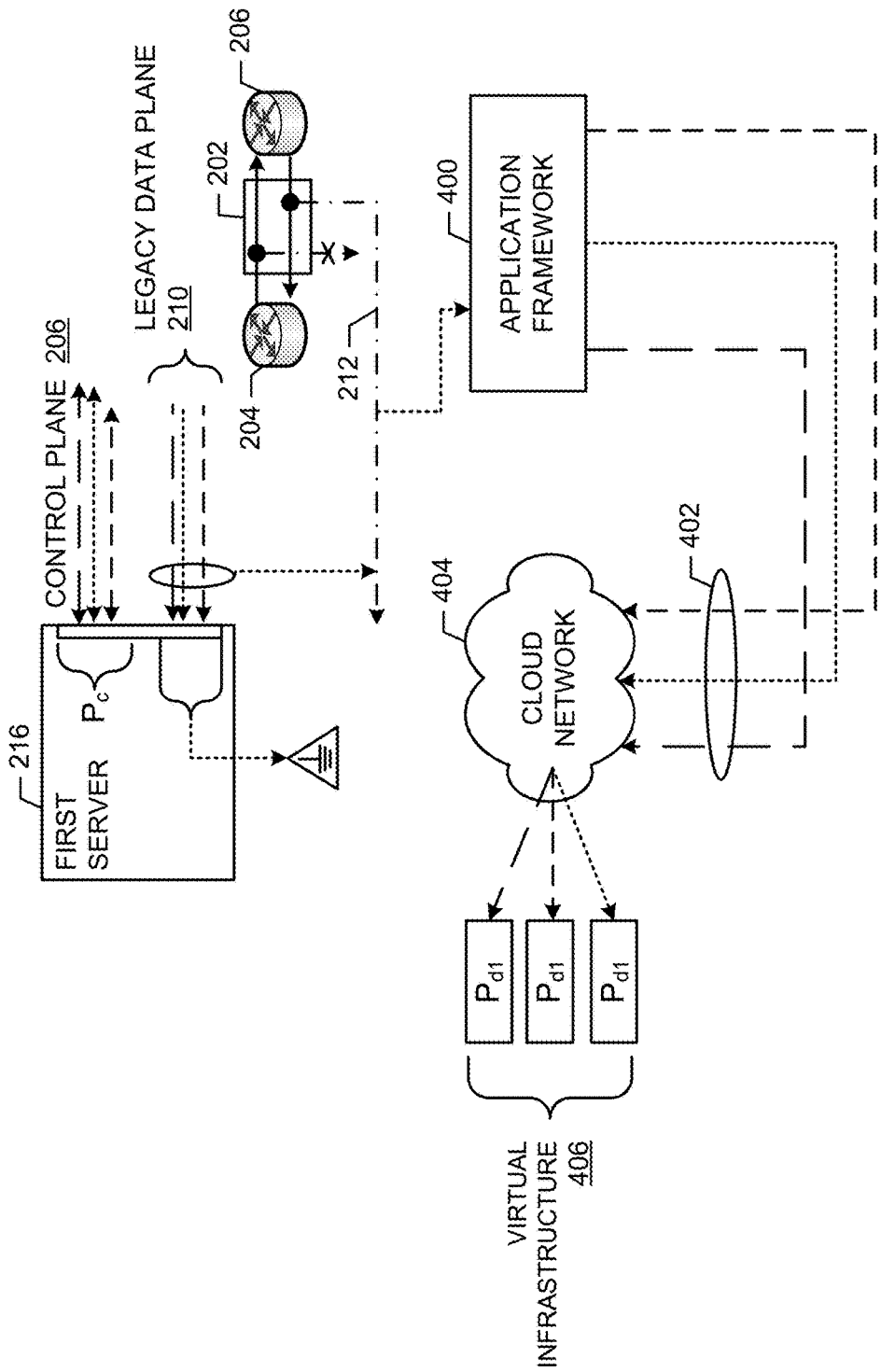
FIG. 4 is an illustration of the example network computing environment of FIG. 2 including an example application framework constructed in accordance with teachings of this disclosure.

FIG. 4 illustrates the observational data plane 212 generated by the example observation point 202 of FIGS. 2 and/or 3 being provided to an application framework 400. In the example of FIG. 4, the application framework 400 includes one or more applications that make use of the observational data plane 212. Example applications of the application framework 400 are disclosed below in connection with FIG. 5. In some examples, one or more of the application(s) of the example application framework 400 of FIG. 4 are made available to, for example, a defined group of users (e.g., customers of a service provider associated with the example network environment 200 of FIG. 2) and/or an undefined group of users (e.g., the public in general). In the example of FIG. 4, the application framework 400 includes application(s) that manipulate the observational data plane 212 and/or otherwise use the observational data plane 212 to generate information. In the illustrated example, the resulting stream of information from the application framework 400 is referred to as a shadowed data plane 402. The example shadowed data plane 402 of FIG. 4 is provided to a cloud network 404. The example cloud network 404 includes one or more computing resources that provide access to, for example, the shadowed data plane 402 and/or the corresponding application(s) of the example application framework 400. As shown in FIG. 4, the cloud network 404 is accessible via a virtual infrastructure 406 that includes one or more instances of, for example, data plane processes and/or applications ($P_{d1}$) that utilize the observational data plane 212 and/or the shadowed data plane 402 provided via the example application framework 400. In some examples, the virtual infrastructure 406 and the corresponding processes $P_{d1}$ include one or more platforms and/or application created by users (e.g., customers of the cloud network 404). Additionally or alternatively, the virtual infrastructure 406 and the corresponding processes $P_{d1}$ include one or more platforms and/or application created by developers associated with the network environment 200 such as, for example, programmers associated with an entity providing the cloud network 404. Further, the example cloud network 404 of FIG. 4 can provide access according to any suitable service model including, for example, Infrastructure as a service (IaaS), Platform as a service (PaaS), Software as a service (SaaS), and/or Unified Communications as a service (UCaaS).

Figure 5:
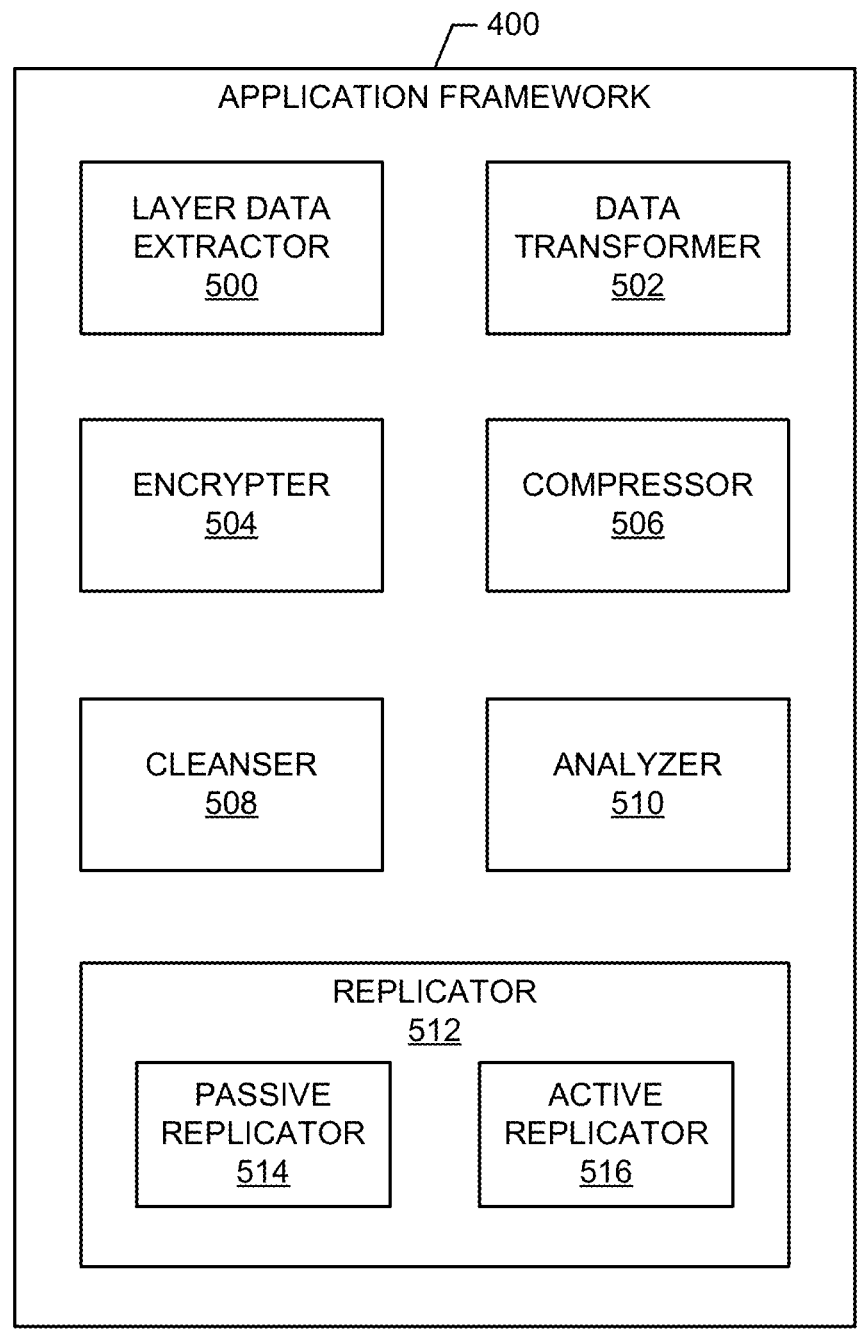
FIG. 5 is a block diagram of an example implementation of the example application framework of FIG. 4.
Figure 6:
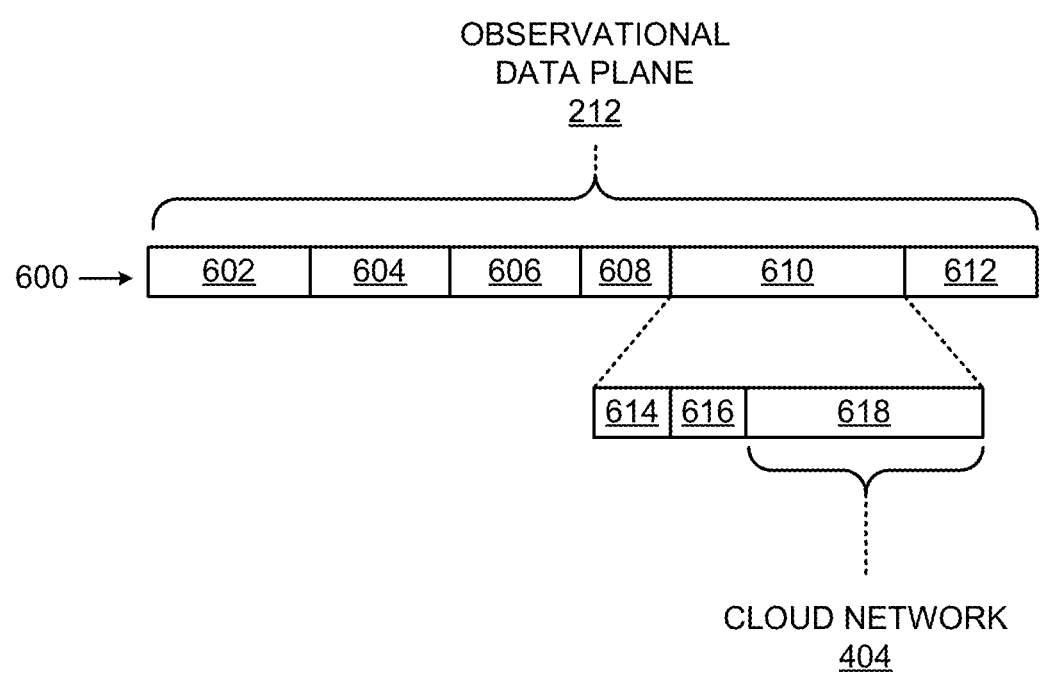
FIG. 6 is an illustration of an example data packet utilized by the example application framework of FIGS. 4 and/or 5.

FIG. 5 is a block diagram of an example implementation of the application framework 400 of FIG. 4. The example application framework 400 of FIG. 4 includes a layer data extractor 500, a data transformer 502, an encrypter 504, a compressor 506, a cleanser 508, an analyzer 510, and a replicator 512. The example layer data extractor 500 of FIG. 5 extracts certain data from the observational data plane 212 and sends the extracted information separately from the observational data plane 212. For example, the layer data extractor 500 of FIG. 5 extracts one or more particular layers from, for example, the Open Systems Interconnection (OSI) model. FIG. 6 illustrates an example extraction performed by the layer data extractor 500 of FIG. 5. In the example of FIG. 6, an example data packet 600 of the observational data plane 212 includes a preamble field (eight octets) 602, a destination MAC address field (six octets) 604, a source MAC address field (six octets) 606, an Ethertype field (two octets) 608, a data field (forty-six to fifteen hundred octets) 610, and a cyclic redundancy check (CRC) field (four octets) 612. In the example of FIG. 6, the data field 610 includes an IP address field 614, a TCP field 616 and an application data field 618. In the illustrated example, the extractor 500 of FIG. 5 extracts the information from the application data field 618 and provides the same to, for example, one or more computing resources of the cloud network 404 of FIG. 4. In some examples, the extractor 500 of FIG. 5 sends the extracted information to the cloud network 404 of FIG. 4 in a first session (e.g., TCP session) and sends the remainder (e.g., non-extracted portions) of the data packet 600 in a second session separate from the first session. As such, the computing resources available via the cloud network 404 can utilize the information extracted from the application data field 618 separately from the remainder of the data packet 600. For example, the extracted data (e.g., one or more portions of the data payload 610) may be a target field for an inspection and/or test, such as a network troubleshooting and/or configuration process.

The example data transformer 502 of FIG. 5 translates one or more portions of the data packet 600 from, for example, a first protocol to a second protocol. For example, the data transformer 502 of FIG. 5 can transform the data packet 600 from a User Datagram Protocol (UDP) packet to a TCP packet, from a TCP packet to a UDP packet, or from any suitable protocol to another suitable protocol. In some examples, the data transformer 502 of FIG. 5 transforms certain portion(s) of the data packet 600 and does not transform other portion(s) of the data packet 600. For example, the data transformer 502 of FIG. 5 may transform layers one through 4 of the OSI model while leaving layers five through seven of the OSI model untouched (e.g., a copy of the data survives). As such, the example data transformer 502 of FIG. 5 can maintain the packet payload (e.g., the data field 610 of FIG. 6) while transforming the other portions of the data packet (e.g., the preamble field 602, the destination MAC address field 604, the source MAC address field 606, and the Ethertype field 608) from UDP to TCP, from TCP to UDP, and/or any other suitable protocols.

The example encrypter 504 of FIG. 5 encrypts one or more portions of the observational data plane 212 such that important information can be transferred and/or accessed securely via the shadowed data plane 402. The example compressor 506 of FIG. 5 compresses one or more portions of the observational data plane 212 to enable, for example, packaging of data such that multiple data units can be transferred together within bandwidth and/or size restrictions and/or to improve throughput. The example cleanser 508 of FIG. 5 removes or masks one or more portions of the observational data plane 212 such as, for example, data associated with a service provider interface (SPI). The example analyzer 510 of FIG. 5 performs any suitable analysis of the observational data plane 212 such as, for example, a statistically analysis to create a derived data plane indicative of one or more metrics associated with the observational data plane 212 (and, thus, the legacy data plane 210).

Figure 7:
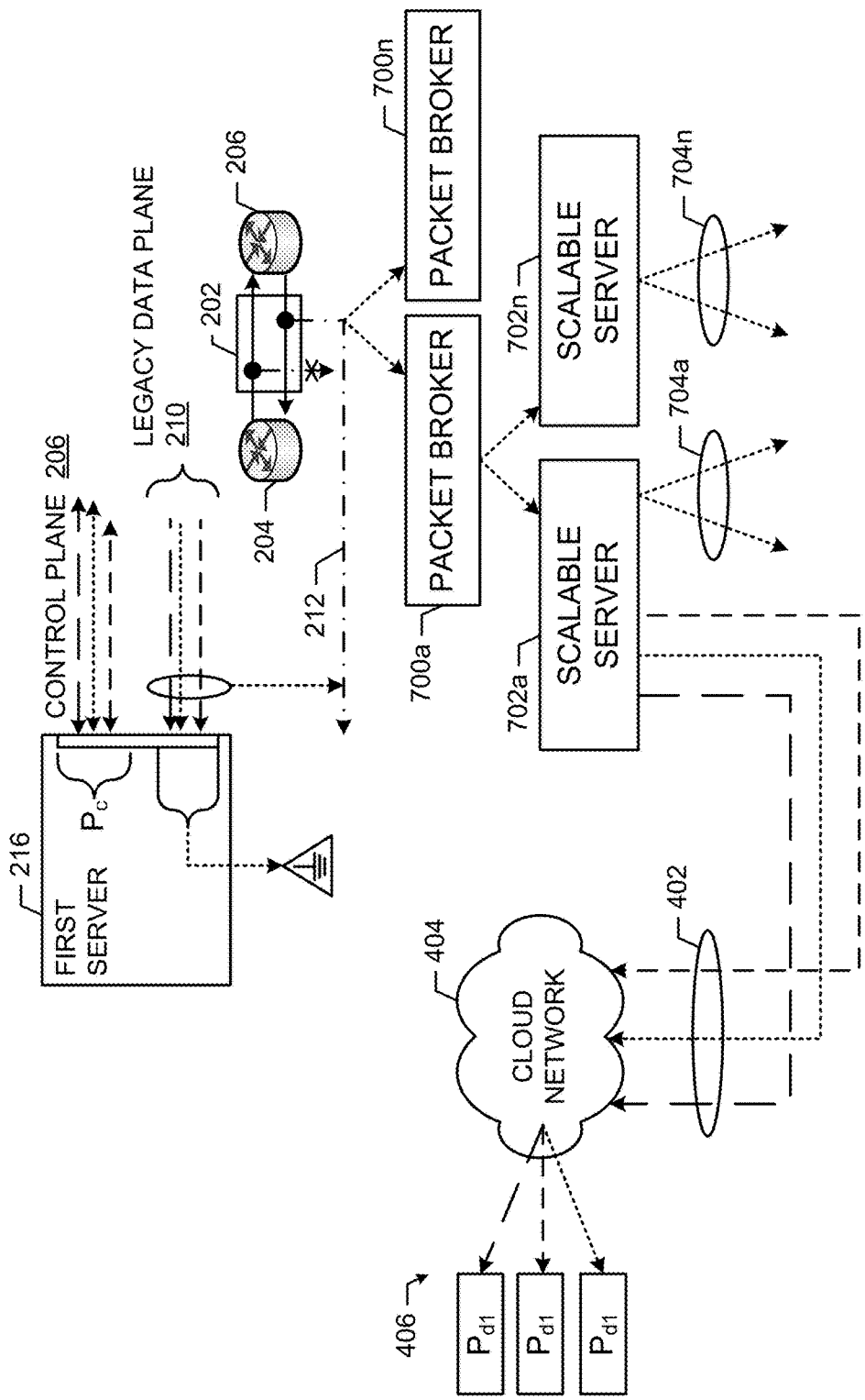
FIG. 7 is an illustration of example replications implemented by the example application framework of FIGS. 4 and/or 5.

The example replicator 512 of FIG. 5 replicates the observational data plane 212 such that the observational data plane 212 can be distributed to, for example, more than one application framework (e.g., the application framework 400 of FIGS. 4 and/or 5) and/or other type(s) of computing platform(s). FIG. 7 is a diagram of an example replication process performed by the example replicator 512 of FIG. 5. In the example of FIG. 5, a passive replicator 514 of the replicator 512 generates one or more replications of the observational data plane 212. In some examples, the passive replicator 514 has a replication factor of thirty-two. The passively generated replications are provided to one of a plurality of packet brokers 700a-n of FIG. 7. The example packet brokers 700a-n aggregate the replicated instances of the observational data plane 212 and/or manipulate the data in any suitable manner (e.g., by mapping the copies of the observational data plane 212 to particular ports of network devices). Further, an active replicator 516 of the example replicator 512 of FIG. 5 generates one or more active replications that are provided to respective ones of a plurality of scalable servers 702a-n (e.g., scalable and/or extensible blade servers). In the illustrated example of FIG. 7, the scalable servers 702a-n include one or more applications and/or platforms that provide services based on the observational data plane 212 to generate the example shadowed data plane 402 of FIG. 4 and/or additional shadowed data planes 704a-n that are provided to the example cloud network 404 of FIG. 4 and/or one or more alternative access networks. In some examples, the scalable servers 702a-n implement one or more instances of the example application framework 400 of FIGS. 4 and/or 5. As such, one or more instances of the application framework 400 can provide replications of the observational data plane 212 to one or more other instances of the application framework 400 of FIGS. 4 and/or 5. Thus, a single implementation of the example observation point 202 and the corresponding observational data plane 212 generated thereby provide significantly large economies of scale and resiliency.

Figure 8:
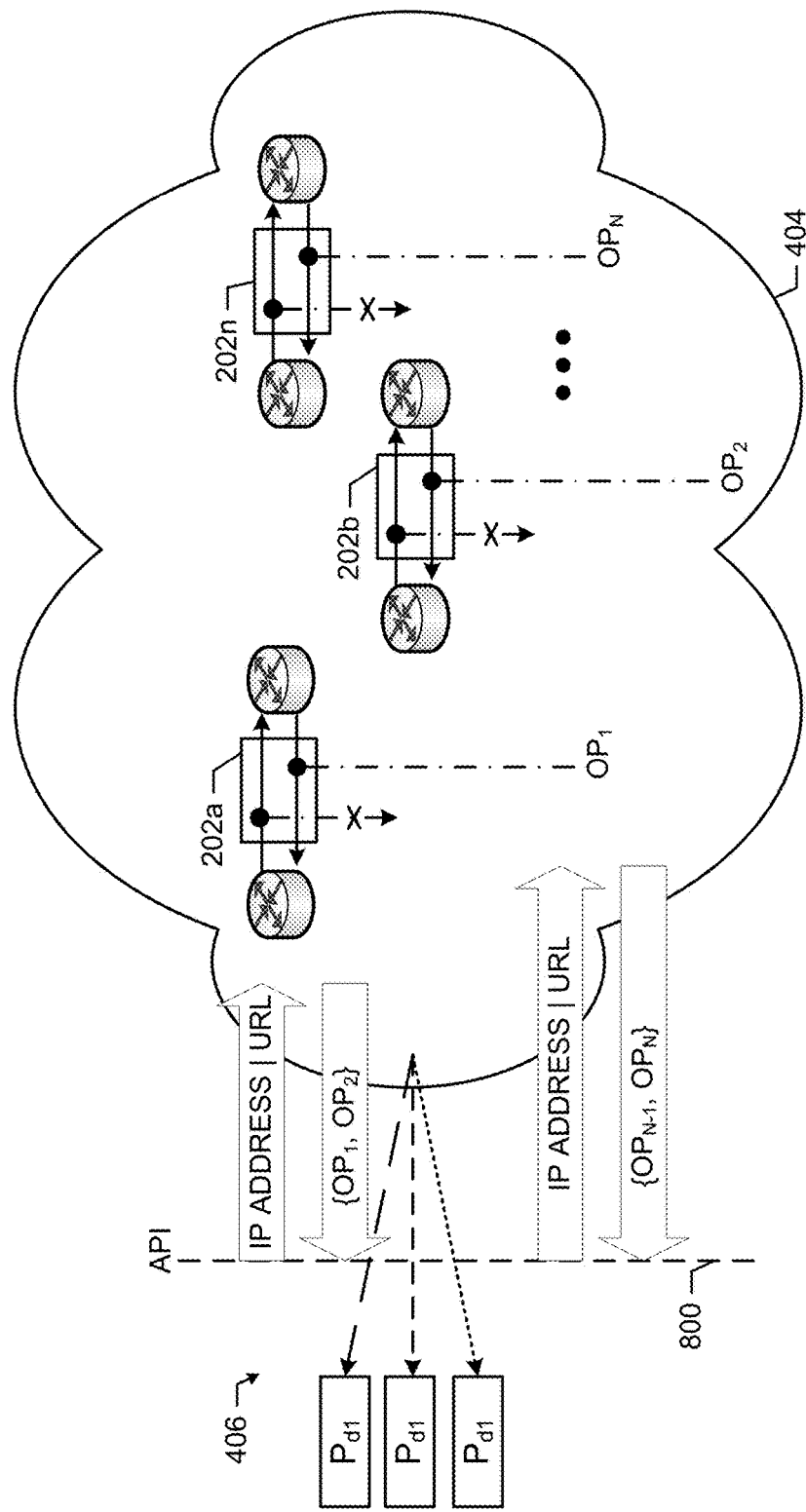
FIG. 8 is another illustration of the example computing network of FIGS. 2 and/or 3.

FIG. 8 is a diagram of example interactions between the example virtual infrastructure 406 of FIG. 4 and the example cloud network 404 of FIG. 4 via an example application programming interface (API) 800. The example API 800 of FIG. 8 receives function calls from, for example, a client or host of the virtual infrastructure 406. In the illustrated example, the function calls are configured according to a protocol of the example API 800. The example API 800 is configured according to, for example, a type of cloud service model (e.g., IaaS, PaaS, SaaS, or UCaaS) is being utilized. In response to receiving a function call, the example API 800 of FIG. 8 extracts information from the request including, for example, an IP address and/or a URL associated with a particular one of a plurality of instances 202a-n of the example observation point 202 of FIGS. 2 and/or 3 deployed among the core routers (e.g., the example core routers 204 and 206 of FIGS. 2 and/or 3). The example API 800 resolves the received information to one of the observation points 202a-n and, thus, one or more services provided by the corresponding instance of the example observational data plane 212. In the illustrated example of FIG. 8, the API 800 identifies at least two of the observation points 202a-n (e.g., OP1 and OP2 in FIG. 8) that span multiple points of presence in the backbone network 208. As such, the example virtual infrastructure 406 is provided a redundant access to the observational data plane 212 and the corresponding services.

Figure 9:
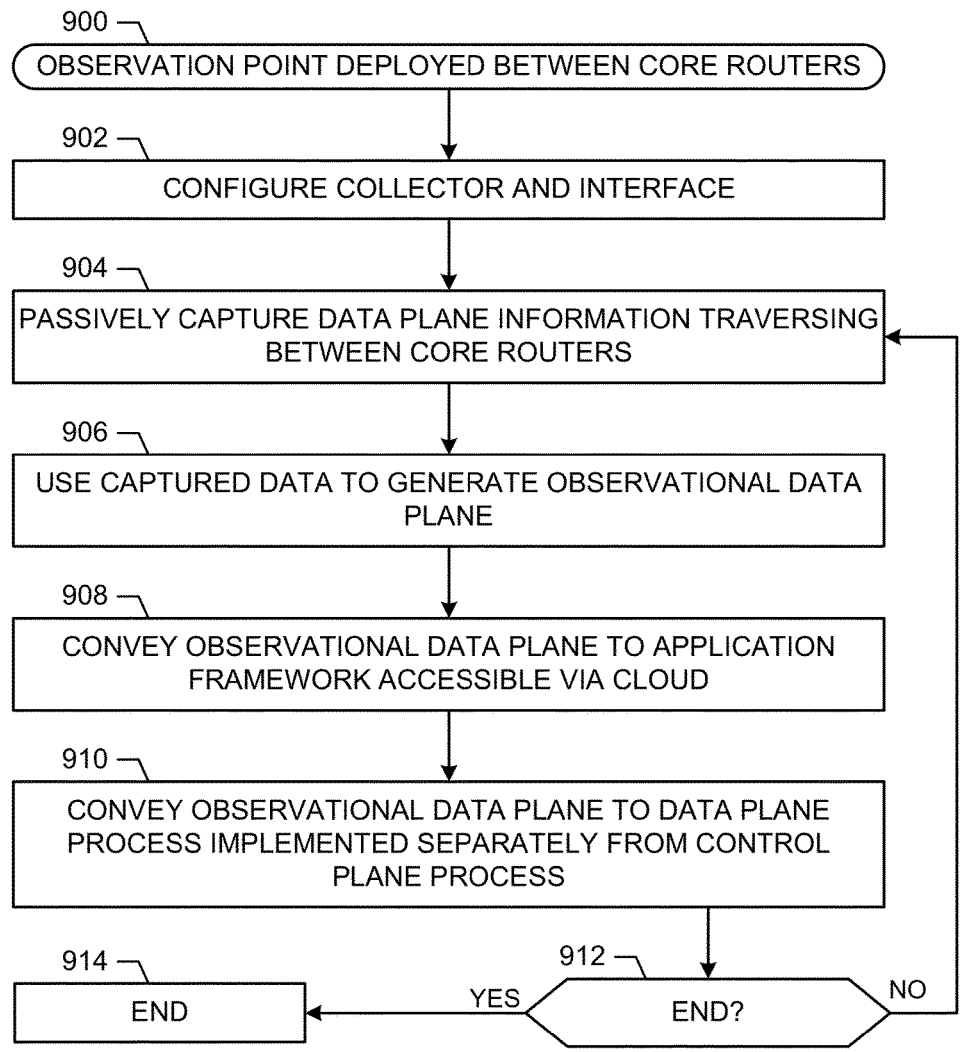
FIG. 9 is a flowchart representative of example machine readable instructions that may be executed to implement the example observation point of FIGS. 2 and/or 3.

A flowchart representative of example machine readable instructions for implementing the observation point 202 of FIGS. 2 and/or 3 is shown in FIG. 9. In this example, the machine readable instructions comprise programs for execution by a processor such as the processor 1012 shown in the example processing system 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire programs and/or parts thereof could alternatively be executed by a device other than the processor 1012 and/or embodied in firmware or dedicated hardware. Further, although the example programs are described with reference to the flowcharts illustrated in FIG. 9, many other methods of implementing the example observation point 202 may alternatively be used. For example, the order of execution of the blocks may be changed, and/or some of the blocks described may be changed, eliminated, or combined.

As mentioned above, the example processes of FIG. 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 9 begins with the example observation point 202 of FIGS. 2 and/or 3 being deployed in, for example, the backbone network 208 of FIG. 2 between the core routers 204 and 206 (block 900). In the example of FIG. 9, the observation point 202 includes a fiber-optic splitter that is placed in communication with the transmissions between the core routers 204 and 206. The example observation application 304 of FIG. 3 configures the example collector 300 of FIG. 3 and the example interface 302 of FIG. 3 such that the collector 300 and the interface 302 can facilitate collection of data plane information via the observation point 202 (block 902). In the example of FIG. 9, configuration of the collector 300 includes providing and/or obtaining a connection identifier associated with the data plane traffic such that the data plane information to be collected can be captured. In the example of FIG. 9, the interface 302 is implemented by a special-purpose NIC having LPO capabilities and/or features.

In the example of FIG. 9, the collector 300 passively captures the data plane traffic and provides the same to, for example, the interface 302 (block 904). Passively collecting the data plane information includes not actively requesting retransmission of, for example, data packets that were lost (e.g., in transmission or at an origination point). Accordingly, capture of the data plane traffic by the example observation point 202 of FIG. 2 is unaffected (e.g., does not prevent accurate and efficient collection of data) by failures or errors in the legacy data plane 210 of FIG. 2.

The example observation application 304 of FIG. 3 processes the collected data plane information to generate the example observational data plane 212 of FIG. 2 (block 906). In the example of FIG. 9, the observational data plane 212 generated by the observation application 304 is a copy of the legacy data plane 210. To form the example observational data plane 212 of FIG. 2, the example observation application 304 of FIG. 3 generates a merged stream of the data plane traffic associated with, for example, a plurality of route reflectors 214a-n and/or the core routers 204 and 206.

In the example of FIG. 9, the observational data plane 212 is conveyed to the application framework 400 of FIG. 4 (block 908). In some examples, the observational data plane 212 is conveyed to additional or alternative destinations to, for example, provide one or more additional or alternative services than those of the example application framework 400 of FIGS. 4 and/or 5. In the example of FIG. 9, the observational data plane 212 is conveyed to the second server 218 of FIG. 2 and the corresponding data plane process $P_d$ (block 910). The legacy data plane 210 is conveyed to the first server 216, which discards the data plane traffic. If the example of FIG. 9 is to end (e.g., the observation point 202 and/or the collection of data plane information via the observation point 202 are deactivated) (block 912), the example of FIG. 9 ends (block 914). Otherwise, control returns to block 904).

Figure 10:
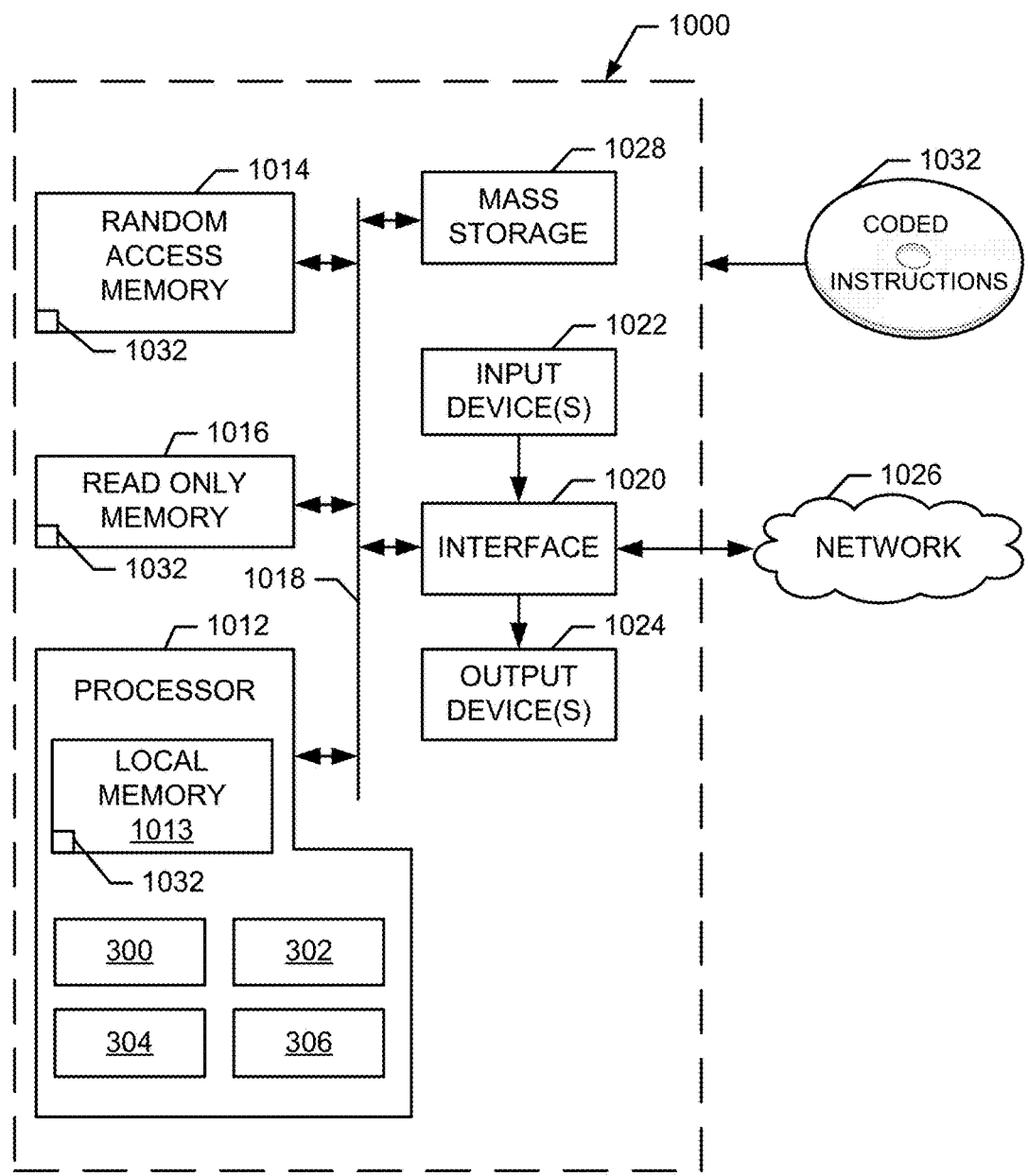
FIG. 10 is a block diagram of an example processing system implementing the observation point of FIGS. 1 and/or 2 by executing the example machine readable instructions of FIG. 9.

FIG. 10 is a block diagram of an example processing system 1000 that has been repurposed to execute the instructions of FIG. 9 to implement the example observation point 202 of FIGS. 2 and/or 3. The processing system 1000 can be, for example, a server, an Internet appliance including a splitter (e.g., a fiber-optic splitter), or any other suitable type of computing device.

The processing system 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example of FIG. 10, one or more aspects of the collector 300, the interface 302, the observation application 304, and/or the example communicator 306 are implemented via the example processor 1012.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The consumer processing system 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, a keyboard, a button, a mouse, a touch screen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touch screen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card (e.g., to implement the example interface 302 of FIG. 3) to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processing system 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 of FIG. 9 may be stored in the mass storage device 1028, in the volatile memory 1014, in the non-volatile memory 1016, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   capturing, via an observation point deployed between core routers of a network, legacy data plane information from a legacy data plane, the legacy data plane information traversing between the core routers of the network;

generating an observational data plane using the legacy data plane information captured via the observation point; and conveying the observational data plane to a data plane process implemented separately from a control plane process, the control plane process operating on a first server, the control plane process receiving control plane traffic from a control plane of the network, the control plane process handling the control plane traffic from the control plane, the first server receiving the legacy data plane information and the control plane traffic traversing between the core routers of the network, the control plane process maintaining TCP sessions across the legacy data plane between the core routers of the network while the first server discards legacy data plane packets from the legacy data plane, the discarding of the legacy data plane packets separating the control plane from the legacy data plane in the network, the separating reducing failures and resynchronization events in the control plane due to failures in the legacy data plane.

2. The method of claim 1, further comprising conveying the observational data plane to an application framework, the application framework including an application to utilize the observational data plane to provide a service.

3. The method of claim 2, wherein the service includes a cloud-based service accessible via a virtual infrastructure.

4. The method of claim 1, wherein capturing the legacy data plane information comprises passively collecting the legacy data plane information, and wherein the observation point includes a lossless packet observation feature.

5. The method of claim 4, wherein passively collecting the legacy data plane information includes not actively requesting retransmission of lost legacy data plane information.

6. The method of claim 1, wherein the data plane process is implemented on a same machine as the control plane process.

7. The method of claim 1, wherein the data plane process is implemented on a different machine from the control plane process.

8. An apparatus, comprising:

memory comprising machine readable instructions; and a processor to execute the machine readable instructions to perform operations comprising:

capturing, at an observation point deployed between core routers of a network, legacy data plane information from a legacy data plane, the legacy data plane information traversing between the core routers of the network;

generating an observational data plane using the legacy data plane information; and conveying the observational data plane to a data plane process implemented separately from a control plane process, the control plane process operating on a first server, the control plane process receiving control plane traffic from a control plane of the network, the control plane process handling the control plane traffic from the control plane, the first server receiving the legacy data plane information and the control plane traffic traversing between the core routers of the network, the control plane process maintaining TCP sessions across the legacy data plane between the core routers of the network while the first server discards legacy data plane packets from the legacy data plane, the discarding of the legacy data plane packets separating the control plane from the legacy data plane in the network, the separating reducing failures and resynchronization events in the control plane due to failures in the legacy data plane.

9. The apparatus of claim 8, wherein the operations further comprise conveying the observational data plane to an application framework, the application framework including an application to utilize the observational data plane to provide a service.

10. The apparatus of claim 9, wherein the service includes a cloud-based service accessible via a virtual infrastructure.

11. The apparatus of claim 8, wherein capturing the legacy data plane information comprises passively collecting the legacy data plane information, and wherein the observation point includes a lossless packet observation feature.

12. The apparatus of claim 11, wherein passively collecting the legacy data plane information includes not actively requesting retransmission of lost legacy data plane information.

13. The apparatus of claim 8, wherein the data plane process is implemented on a same machine as the control plane process.

14. The apparatus of claim 8, wherein the data plane process is implemented on a different machine from the control plane process.

15. A tangible computer readable storage medium comprising instructions that, when executed, cause an observation point deployed between core routers of a network to perform operations comprising:

capturing legacy data plane information from a legacy data plane, the legacy data plane information traversing between the core routers of the network;

generating an observational data plane using the legacy data plane information; and conveying the observational data plane to a data plane process implemented separately from a control plane process, the control plane process operating on a first server, the control plane process receiving control plane traffic from a control plane of the network, the control plane process handling the control plane traffic from the control plane, the first server receiving the legacy data plane information and the control plane traffic traversing between the core routers of the network, the control plane process maintaining TCP sessions across the legacy data plane between the core routers of the network while the first server discards legacy data plane packets, the discarding of the legacy data plane packets separating the control plane from the legacy data plane in the network, the separating reducing failures and resynchronization events in the control plane due to failures in the legacy data plane.

16. The tangible computer readable storage medium of claim 15, wherein the operations further comprise conveying the observational data plane to an application framework, the application framework including an application to utilize the observational data plane to provide a service.

17. The tangible computer readable storage medium of claim 16, wherein the service includes a cloud-based service accessible via a virtual infrastructure.

18. The tangible computer readable storage medium of claim 15, wherein capturing the legacy data plane information comprises passively collecting the legacy data plane information, and wherein the observation point includes a lossless packet observation feature.

19. The tangible computer readable storage medium of claim 18, wherein passively collecting the legacy data plane information includes not actively requesting retransmission of lost legacy data plane information.

20. The tangible computer readable storage medium of claim 15, wherein the data plane process is implemented on a different machine from the control plane process.

\* \* \* \* \*